(12) United States Patent
Broden et al.

(10) Patent No.: US 8,132,464 B2
(45) Date of Patent: Mar. 13, 2012

(54) DIFFERENTIAL PRESSURE TRANSMITTER WITH COMPLIMENTARY DUAL ABSOLUTE PRESSURE SENSORS

(75) Inventors: David A. Broden, Andover, MN (US); Robert C. Hedtke, Young America, MN (US); Andrew J. Klosinski, Chico, CA (US); Fred C. Sittler, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 12/834,245

(22) Filed: Jul. 12, 2010

(65) Prior Publication Data

US 2012/0006119 A1 Jan. 12, 2012

(51) Int. Cl.
*G01L 13/02* (2006.01)
(52) U.S. Cl. ............................................. 73/716; 73/736
(58) Field of Classification Search .................. None
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,169,402 A | 2/1965 | Baker | 73/407 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,410,135 A | 11/1968 | Reynaud | 73/141 |
| 3,557,621 A | 1/1971 | Ferran | 73/398 |
| 3,561,832 A | 2/1971 | Karrer et al. | 310/9.6 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,120,206 A | 10/1978 | Rud, Jr. | 73/718 |

(Continued)

FOREIGN PATENT DOCUMENTS

DE 1 932 899 1/1971

(Continued)

OTHER PUBLICATIONS

"Notification of Transmittal of the International Search Report and the Written Opinion of The International Searching Authority, or the Declaration", PCT/US2006/036404, filed Sep. 19, 2006; 2 pages.

(Continued)

*Primary Examiner* — Andre Allen
(74) *Attorney, Agent, or Firm* — Westman, Champlin & Kelly, P.A.

(57) ABSTRACT

A process variable transmitter for measuring a pressure of a process fluid includes a process coupling having a first port configured to couple to a first process pressure and a second port configured to couple to a second process pressure. A differential pressure sensor is coupled to the first and second ports and provides an output related to a differential pressure between the first pressure and the second pressure. First and second pressure sensors couple to the respective first and second ports and provide outputs related to the first and second pressures. Transmitter circuitry is configured to provide a transmitter output based upon the output from the differential pressure sensor and/or the first and/or second pressure sensors. Additional functionality is provided by the transmitter using the sensed first and/or second pressures.

19 Claims, 5 Drawing Sheets

U.S. PATENT DOCUMENTS

| | | | |
|---|---|---|---|
| 4,158,217 A | 6/1979 | Bell | 361/283 |
| 4,161,123 A | 7/1979 | Carpenter | 73/741 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,244,226 A | 1/1981 | Green et al. | 73/703 |
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A | 8/1984 | Frick | 73/756 |
| 4,490,773 A | 12/1984 | Moffatt | 361/283 |
| 4,531,415 A | 7/1985 | Orlowski et al. | 73/718 |
| 4,538,466 A | 9/1985 | Kerber | 73/724 |
| 4,542,436 A | 9/1985 | Carusillo | 361/283 |
| 4,558,184 A | 12/1985 | Busch-Vishniac et al. | 381/174 |
| 4,562,742 A | 1/1986 | Bell | 73/718 |
| 4,578,735 A | 3/1986 | Knecht et al. | 361/283 |
| 4,586,108 A | 4/1986 | Frick | 361/283.3 |
| 4,604,901 A | 8/1986 | Kagi | 73/731 |
| 4,623,813 A | 11/1986 | Naito et al. | 310/313 R |
| 4,644,796 A | 2/1987 | Ward | 73/702 |
| 4,670,733 A | 6/1987 | Bell | 338/36 |
| 4,739,666 A | 4/1988 | Hafner et al. | 73/862.68 |
| 4,741,213 A | 5/1988 | Hojoh | 73/702 |
| 4,785,669 A | 11/1988 | Benson et al. | 73/718 |
| 4,829,826 A | 5/1989 | Valentin et al. | 73/718 |
| 4,860,232 A | 8/1989 | Lee et al. | 364/571.04 |
| 4,864,874 A | 9/1989 | Hafner | 73/862.382 |
| 4,875,369 A | 10/1989 | Delatorre | 73/151 |
| 4,878,012 A | 10/1989 | Schulte et al. | 324/60 |
| 4,878,385 A | 11/1989 | Lloyd | 73/704 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,995,265 A | 2/1991 | Stocker | 73/702 |
| 5,012,677 A | 5/1991 | Shimada et al. | 73/721 |
| 5,094,109 A | 3/1992 | Dean et al. | 73/718 |
| 5,136,885 A | 8/1992 | Liebermann et al. | 73/702 |
| 5,144,841 A | 9/1992 | Brouwers et al. | 73/706 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,291,795 A | 3/1994 | Hafner | 73/862.629 |
| 5,329,818 A | 7/1994 | Frick et al. | 73/708 |
| 5,415,048 A | 5/1995 | Diatschenko et al. | 73/861.04 |
| 5,469,749 A | 11/1995 | Shimada et al. | 73/861.47 |
| 5,471,882 A | 12/1995 | Wiggins | 73/702 |
| 5,492,016 A | 2/1996 | Pinto et al. | 73/724 |
| 5,495,769 A | 3/1996 | Broden et al. | 73/718 |
| 5,524,492 A | 6/1996 | Frick et al. | 73/706 |
| 5,531,120 A | 7/1996 | Nagasu et al. | 73/706 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,680,109 A | 10/1997 | Lowe et al. | 340/608 |
| 5,705,978 A | 1/1998 | Frick et al. | 340/511 |
| 5,757,608 A | 5/1998 | Bernot et al. | 361/283.4 |
| 5,760,310 A | 6/1998 | Rud et al. | 73/706 |
| 5,911,162 A | 6/1999 | Denner | 73/718 |
| 5,920,016 A | 7/1999 | Broden | 73/756 |
| 5,969,258 A | 10/1999 | Gerst et al. | 73/718 |
| 5,992,240 A | 11/1999 | Tsuruoka et al. | 73/718 |
| 6,003,219 A | 12/1999 | Frick et al. | 29/25.41 |
| 6,047,244 A | 4/2000 | Rud, Jr. | 702/98 |
| 6,236,096 B1 | 5/2001 | Chang et al. | 257/419 |
| 6,250,164 B1 | 6/2001 | O'Brien et al. | 73/730 |
| 6,295,875 B1 | 10/2001 | Frick et al. | 73/718 |
| 6,301,973 B1 | 10/2001 | Smith | 73/861.357 |
| 6,367,333 B1 | 4/2002 | Bullister et al. | 73/715 |
| 6,484,585 B1 | 11/2002 | Sittler et al. | 73/718 |
| 6,508,131 B2 | 1/2003 | Frick | 73/756 |
| 6,520,020 B1 | 2/2003 | Lutz et al. | 73/706 |
| 6,539,807 B1 | 4/2003 | Wohlrab et al. | 73/723 |
| 6,543,291 B1 | 4/2003 | Kurtz et al. | 73/716 |
| 6,564,643 B1 | 5/2003 | Horie et al. | 73/724 |
| 6,568,278 B2 * | 5/2003 | Nelson et al. | 73/756 |
| 6,647,794 B1 | 11/2003 | Nelson et al. | 73/718 |
| 6,654,697 B1 | 11/2003 | Eryurek et al. | 702/47 |
| 6,662,662 B1 | 12/2003 | Nord et al. | 73/715 |
| 6,675,655 B1 | 1/2004 | Broden et al. | 73/716 |
| 6,701,274 B1 | 3/2004 | Eryurek et al. | 702/140 |
| 6,828,801 B1 | 12/2004 | Burdick et al. | 324/658 |
| 6,892,582 B1 | 5/2005 | Satou et al. | 73/715 |
| 6,901,101 B2 | 5/2005 | Frick | 372/92 |
| 6,945,115 B1 | 9/2005 | Wang | 73/718 |
| 6,992,492 B2 | 1/2006 | Burdick et al. | 324/658 |
| 7,379,629 B1 | 5/2008 | Burns | 385/12 |
| 7,401,522 B2 * | 7/2008 | Broden et al. | 73/716 |
| 7,461,562 B2 * | 12/2008 | Schumacher | 73/861.42 |
| 7,467,555 B2 | 12/2008 | Schulte et al. | 73/736 |
| 7,540,196 B2 | 6/2009 | Kurtz et al. | 73/714 |
| 7,624,642 B2 | 12/2009 | Romo | 73/717 |
| 7,702,478 B2 * | 4/2010 | Hedtke et al. | 702/100 |
| 2002/0117006 A1 | 8/2002 | Paros et al. | 73/717 |
| 2002/0178822 A1 * | 12/2002 | Nelson et al. | 73/700 |
| 2002/0178827 A1 | 12/2002 | Wang | 73/718 |
| 2003/0177837 A1 * | 9/2003 | Broden et al. | 73/716 |
| 2004/0015069 A1 | 1/2004 | Brown | 600/407 |
| 2004/0093951 A1 | 5/2004 | Viola et al. | 73/728 |
| 2004/0168523 A1 | 9/2004 | Fernald et al. | 73/861.01 |
| 2004/0233458 A1 | 11/2004 | Frick | 356/480 |
| 2005/0005712 A1 | 1/2005 | Gysling et al. | 73/861.23 |
| 2005/0011278 A1 | 1/2005 | Brown et al. | 73/861.18 |
| 2005/0041375 A1 | 2/2005 | Rosenau | 361/524 |
| 2005/0063444 A1 | 3/2005 | Frick | 372/92 |
| 2005/0097963 A1 | 5/2005 | Wilda | 73/716 |
| 2005/0132808 A1 | 6/2005 | Brown et al. | 73/592 |
| 2006/0070448 A1 | 4/2006 | Baumann et al. | 73/730 |
| 2006/0206288 A1 | 9/2006 | Brahmajosyula et al. | 702/183 |
| 2006/0232281 A1 | 10/2006 | Vittorio et al. | 324/652 |
| 2006/0278005 A1 | 12/2006 | Broden et al. | 73/716 |
| 2006/0278007 A1 | 12/2006 | Harasyn et al. | 73/723 |
| 2007/0220985 A1 | 9/2007 | Hedtke | 73/715 |
| 2008/0006094 A1 | 1/2008 | Schulte et al. | 73/736 |

FOREIGN PATENT DOCUMENTS

| | | |
|---|---|---|
| DE | 3340834 A1 | 5/1985 |
| DE | 43 33 753 | 5/1994 |
| EP | 0 423 903 A2 | 6/1985 |
| EP | 0291393 | 11/1988 |
| EP | 0 524 550 A1 | 1/1993 |
| EP | 1 026 493 A2 | 8/2000 |
| FR | 941804 | 1/1949 |
| GB | 1530952 | 3/1976 |
| GB | 2178536 | 2/1987 |
| JP | 2005280536 | 10/2005 |
| WO | WO 93/04343 | 3/1993 |
| WO | WO 93/04349 | 3/1993 |
| WO | WO 99/53286 | 10/1999 |
| WO | WO 01/59418 | 8/2001 |
| WO | WO 01/59419 | 8/2001 |
| WO | WO 02/23148 | 3/2002 |
| WO | WO 2005/033643 | 4/2005 |
| WO | WO 2006/092052 | 9/2006 |
| WO | WO 2007/019676 | 2/2007 |

OTHER PUBLICATIONS

"International Search Report", PCT/US2006, 036404, filed Sep. 19, 2006; 3 pages.

"Written Opinion of the International Searching Authority", PCT/US2006/036404, filed Sep. 19, 2006; 6 pages.

"Notification of Transmittal of the International Search Report and the Written Opinion of the International Searching Authority, or the Declaration"; PCT/US2006/046742; filed Jul. 12, 2006; 11 pages.

"Notification of Transmittal of the International Search Report and the Written Opinion" for PCT/US2007/012050.

Notification of Transmittal of the International Search Report and the Written Opinion of the International Searching Authority, or the Declaration of PCT/US2006/020254.

Notification of Transmittal of the International Search Report and the Written Opinion of the International Searching Authority, or the Declaration for PCT/US2006/019955.

Notification of Transmittal of the International Search Report and the Written Opinion of the International Searching Authority, or the Declaration for International Application No. PCT/US2009/064712 filed Nov. 17, 2009; 14 pages.

Notification of Transmittal of the International Search Report and the Written Opinion of the International Searching Authority, or the Declaration for International Application No. PCT/US2009/064705 filed Nov. 17, 2009; 16 pages.

Notification of Transmittal of the International Search Report and the Written Opinion of the International Searching Authority, or the Declaration for International Application No. PCT/US2009/064705 filed Nov. 17, 2009; 16 pages.

Notification of Transmittal of the International Search Report and the Written Opinion of the International Searching Authority, or the Declaration for International Application No. PCT/US2009/064716 filed Nov. 17, 2009; 13 pages.

Search Report and Written Opinion for PCT/US2011/038692, dated Oct. 7, 2011, 10 pgs.

* cited by examiner

DIFFERENTIAL PRESSURE TRANSMITTER WITH COMPLIMENTARY DUAL ABSOLUTE PRESSURE SENSORS

CROSS-REFERENCE TO RELATED APPLICATION

The present application is related to co-pending application Ser. No. 12/834,393, filed on Jul. 12, 2010, and entitled TRANSMITTER OUTPUT WITH SCALABLE RANGEABILITY, the content of which is hereby incorporated by reference in its entirety.

BACKGROUND OF THE INVENTION

The present invention relates to measurement of pressures of process fluids in industrial processes. More specifically, the present invention relates to measuring line pressure in a differential pressure transmitter.

Industrial processes are used in the manufacturing and transport of many types of materials. In such systems, it is often required to measure different types of pressure within the process. One type of pressure which is frequently measured is a differential pressure. This is the pressure difference between one point in the process and another point in the process. For example, the differential pressure across an orifice plate in a pipe containing a flow of process fluid is related to the flow rate of the fluid. Differential pressures can also be used, for example, to measure height of a process fluid in a tank or other container.

In industrial processes, the pressure sensors are typically contained in, or coupled to, a pressure transmitter which is located at a remote location and transmits pressure related information back to a centralized location such as a control room. The transmission is frequently over a process control loop. For example, a two-wire process control loop is often used in which two wires are used to carry both information as well as power to the transmitter. Wireless communication techniques may also be used.

Advancements in transmitter technology have increased the amount of information that can be produced by a transmitter. In particular, transmitters can be equipped with multiple sensors to measure multiple process variable inputs or a wider range of a single process variable. For example, transmitters can be provided with multiple pressure sensors as described in U.S. Pat. No. 5,495,769 to Braden et al., U.S. Pat. No. 6,047,244 to Rud, Jr. and U.S. Pat. No. 7,467,555 to Schulte et al., all of which are assigned to Rosemount Inc., Eden Prairie, Minn.

In many process installations, in addition to measuring a differential pressure, it is also desirable to measure an absolute or gauge pressure (also referred to as "line pressure") of the process. This information can be used, for example, to provide more accurate flow measurements by including changes in density of the process fluid in the flow calculations. The additional pressure measurements can be made using a separate pressure sensor coupled to the process fluid.

SUMMARY OF THE INVENTION

A process variable transmitter for measuring a pressure of a process fluid includes a process coupling having a first port configured to couple to a first process pressure and a second port configured to couple to a second process pressure. A differential pressure sensor is coupled to the first and second ports and provides an output related to a differential pressure between the first pressure and the second pressure. At least a first pressure sensor couples to the first port and provides an output related to the first pressure. Transmitter circuitry is configured to provide a transmitter output based upon the output from the differential pressure. Additional functionality is provided by the transmitter using the sensed first pressure and second sensed pressure.

DETAILED DESCRIPTION OF ILLUSTRATIVE EMBODIMENTS

In one embodiment, the present invention provides an apparatus and method for providing additional functionality to a differential pressure measurement transmitter using dual line pressure sensors. More specifically, in one aspect, the present invention includes line pressure sensors which are coupled opposite sides of a differential pressure sensor for use in performing diagnostics or providing other functionality.

Figure 1:
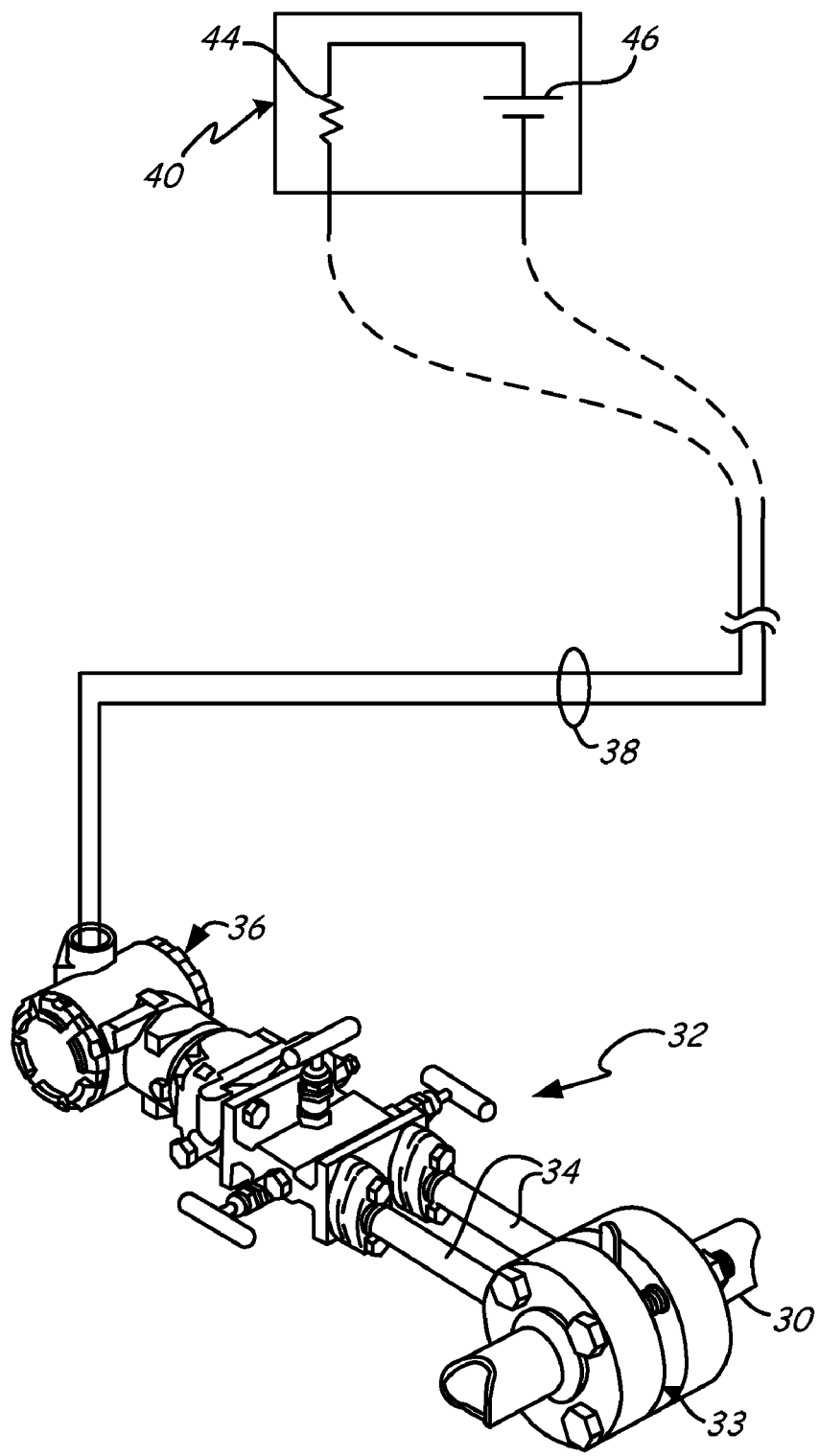
FIG. 1 shows a process measurement system with a process transmitter constructed in accordance with the present invention.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it flows past the primary element 33.

Transmitter 36 is a process measurement device that receives process pressures through the impulse piping 34. The transmitter 36 senses a differential process pressure and converts it to a standardized transmission signal that is a function of the process pressure.

A process loop 38 provides both a power signal to the transmitter 36 from control room 40 and bi-directional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A control room 40 includes a voltage power supply 46 that powers the transmitter 36 and a series resistance 44. In another example configuration, loop 38 is a wireless connection in which data may be transmitted or received wirelessly either in a point-to-point configuration, a mesh network, or other configuration.

Figure 2:
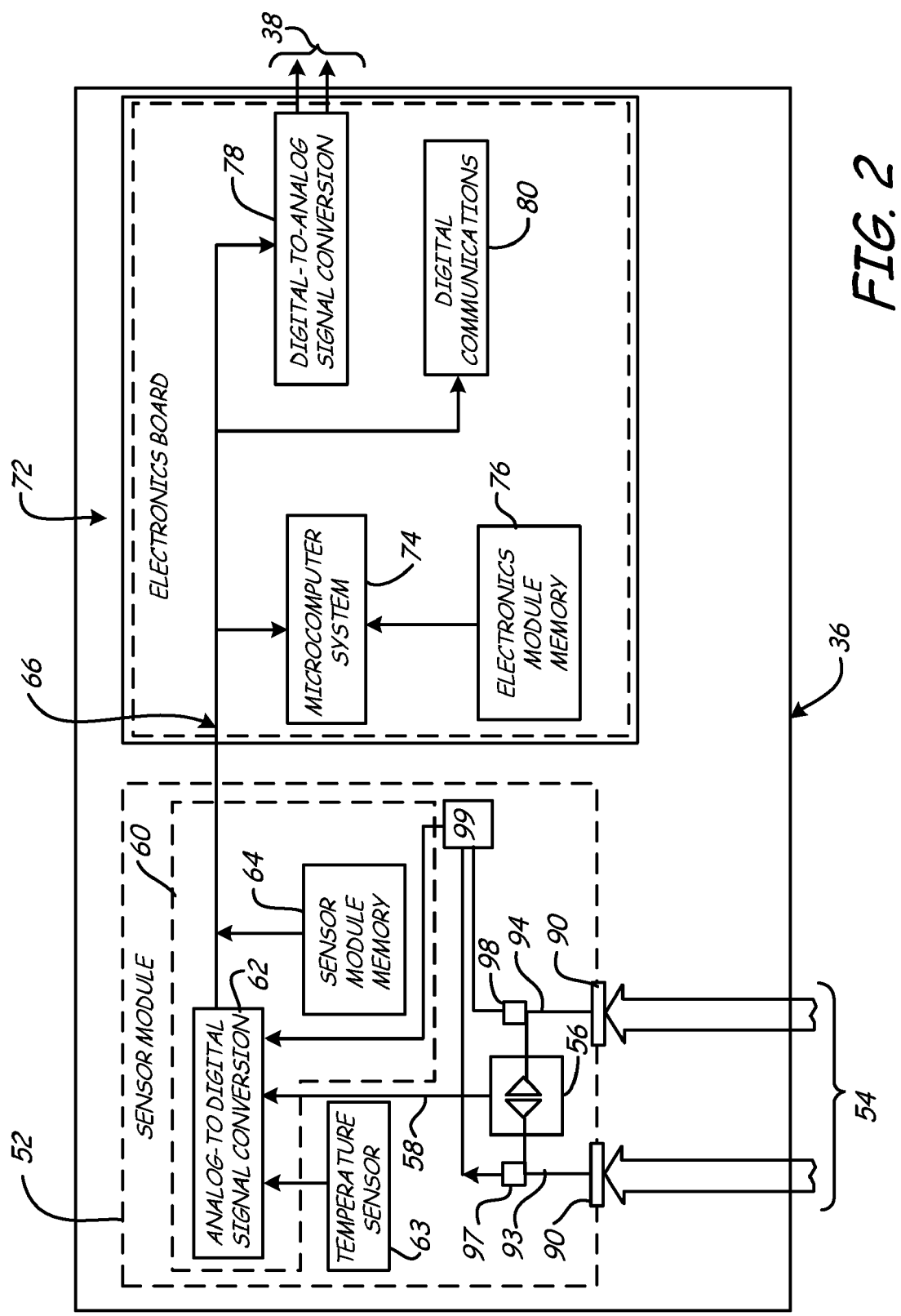
FIG. 2 is simplified block diagram of the process transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to differential pressure sensor 56 which received an applied differential pressure

54. The data connection 58 couples sensor 56 to an analog to digital converter 62. An optional temperature sensor 63 is also illustrated along with sensor module memory 64. The electronics board 72 includes a microcomputer system 74 (or microprocessor), electronics memory module 76, digital to analog signal conversion 78 and digital communication block 80.

Also illustrated in FIG. 2 are capillary or "fill" tubes 93 and 94 which are used to couple the differential pressure sensor 56 to the process fluid 54. Isolation diaphragms 90 receive pressures from the process fluid 54 which is responsibly applied to a fill fluid carried in capillary tubes 93 and 94. Through this fill fluid, the pressures of the industrial process are applied to the differential pressure sensor 56.

In accordance with the illustrated embodiment, a line pressure sensors 97 and 98 couple to capillary tubes 93 and 94, respectively, and are arranged to monitor the pressures in capillary tubes 93 and 94. Line pressure sensors 97 and 98 couple to pressure measurement circuitry 99. Circuitry 99 can comprise, for example, circuitry which is responsive to electrical parameters of the sensor 97 and 99 which change as functions of the applied link pressure. For example, pressure sensors 97 and 98 may operate in accordance with known techniques including pressure measurement techniques in which an electrical capacitance of the sensors 97 and 98 changes, an electrical resistance of the sensors 97 and 98 changes, a resonant frequency of the sensors changes, etc. One specific configuration is discussed below in more detail. Circuitry 99 can be stand alone circuitry or, in some configurations, may be embodied in other circuitry used to measure the differential pressure. For example, some or all of the components used to monitor the various sensors may be shared components.

Figure 3:
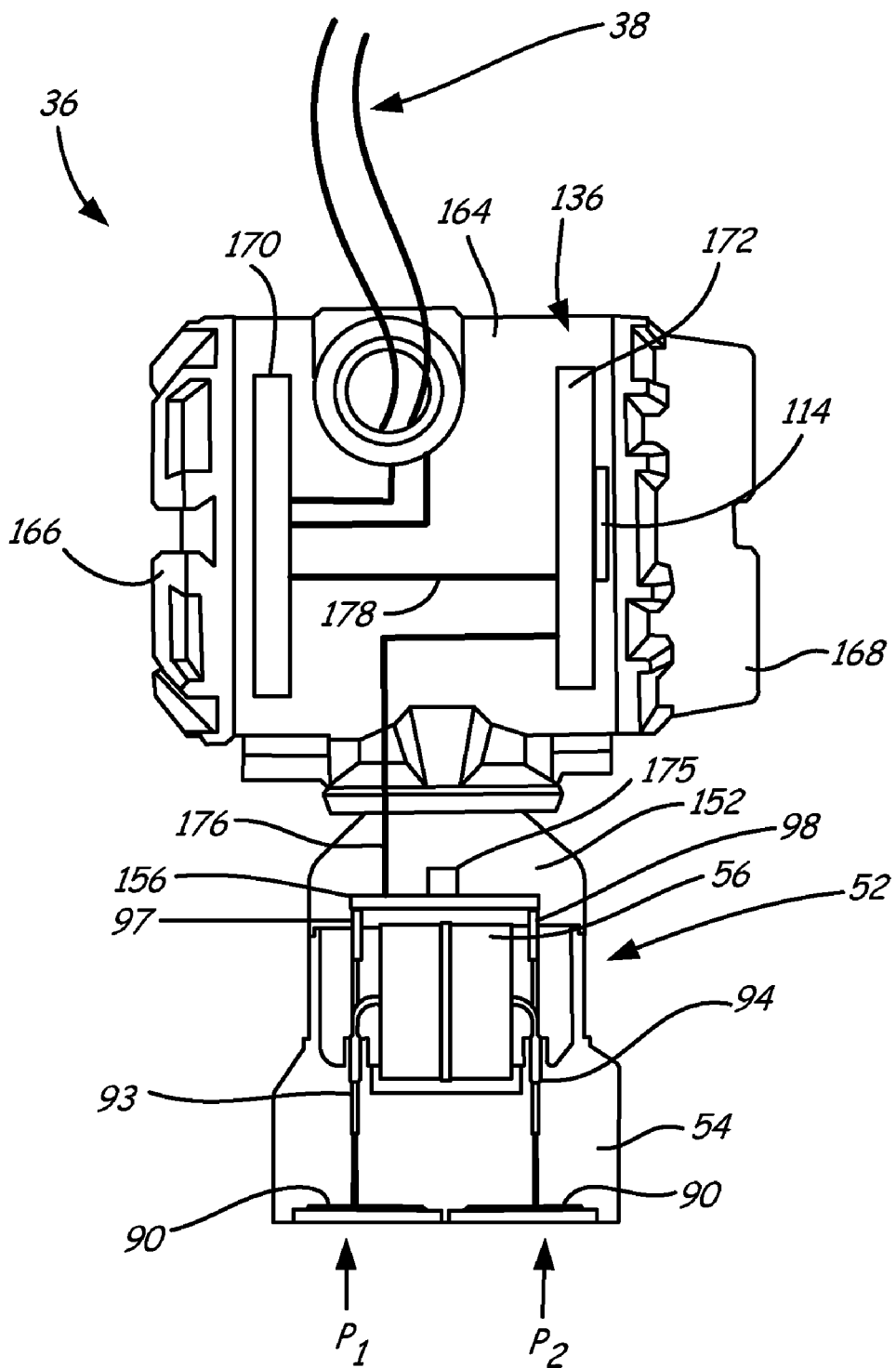
FIG. 3 is a schematic side view of the process transmitter of FIG. 1 showing transmitter electronics.

FIG. 3 schematically shows one embodiment of pressure transmitter 36 having sensor module 52 and transmitter electronics module 136. Sensor module 52 includes housing 152 and base 54, in which are disposed sensor board 156, differential pressure sensor 56, isolation or tubes 93 and 94 and isolation diaphragms 90. Transmitter electronics module 136 includes housing 164, cover 166, display cover 168, output interface 170 and transmitter circuitry 172. Sensor module 52 also includes line pressure sensors 97 and 98 and temperature sensor 175. Pressures $P_1$ and $P_2$ are produced on either side of primary element 33 shown in FIG. 1.

Sensor board 156 and sensor 56 are mounted within housing 152 of sensor module 52. Housing 152 of sensor module 52 connects to housing 164 of electronics module 136 through, for example, a threaded connection. Similarly, covers 166 and 168 are connected to housing 164 through threaded connections that form flame-quenching seals, as are known in the art, to prevent escape of flames from within housing 164. Output interface 170 and transmitter circuitry 172 are mounted to housing 164 within transmitter electronics module 136 and form electronics board 72 shown in FIG. 2.

In the illustrated embodiment, sensor 56 is a capacitance-based differential pressure cell having a sensing diaphragm disposed between a pair of electrode plates. In one embodiment, sensor 56 is a metal-diaphragm type sensor as is described in U.S. Pat. No. 6,295,875 to Frick et al., which is assigned to Rosemount Inc., Eden Prairie, Minn. Sensor 56 is connected to base 54 with isolation tubes 93 and 94, in which is disposed a hydraulic fill fluid. Isolation diaphragms 90 separate the fill fluid within isolation tubes 93 and 94 from pressures $P_1$ and $P_2$ of process fluid. Changes in pressures $P_1$ and $P_2$ of process fluid are sensed as differential pressure $\Delta P$ by sensor 56 through isolation diaphragms 90 within base 54 and the hydraulic fill fluid within isolation tubes 93 and 94. However, the invention is not limited to this differential pressure measurement configuration.

In the described embodiment, line pressure sensors 97 and 98 are capacitance-based absolute pressure sensors. In one configuration, sensors 97 and 98 are capacitive pressure sensors as are described in U.S. Pat. No. 6,484,585 to Sittler et al. and the related series of applications, all of which are assigned to Rosemount Inc., Eden Prairie, Minn. Such sensors include technology that uses brittle sensing materials having high compression strength. For example, a brittle material such as sapphire. Sensors 97 and 98 sense line pressures $P_1$ and $P_2$ of the fill fluid in isolation tubes 93 and 94, respectively. The pressures sensed by each of pressure sensors 97 and 98 can be compared to one another to produce a signal representative of the differential pressure $\Delta P$ that can be used in place of, or for comparison to, the differential pressure $\Delta P$ sensed by sensor 56.

Sensors 56, 97 and 98 together form a sensor system that includes a differential sensor apparatus having a single sensor device, and an absolute sensor apparatus having two sensor devices. Differential pressure sensor 56 and absolute pressure sensors 97 and 98 are in electronic communication with sensor board 156. Sensor board 156 is in electronic communication with transmitter circuitry 172 through sensor cable 176. Transmitter circuitry 172 is in electronic communication with output interface 70 through electronics cable 178. Output interface 170 connects transmitter 36 to wiring of control loop 38. In other embodiments of the invention, performance of the functions of transmitter circuitry 172, sensor board 156 and output interface 170 are distributed and implement differently as desired.

Sensor 56 accurately measures small differential pressures. Further, sensors 97 and 98 accurately measure absolute pressures. Sensor 56 directly measures the difference between line pressures $P_1$ and $P_2$. Sensors 97 and 98 directly measure pressures $P_1$ and $P_2$, respectively. The difference between the outputs from sensors 97 and 98 can be used to determine large differential pressures, perform diagnostics, provide calibration to sensor 56, etc. or provide other functionality. Sensors 56, 97 and 98 can thus be used in a wide variety of scenarios to sense line pressures and differential pressures.

Figure 4:
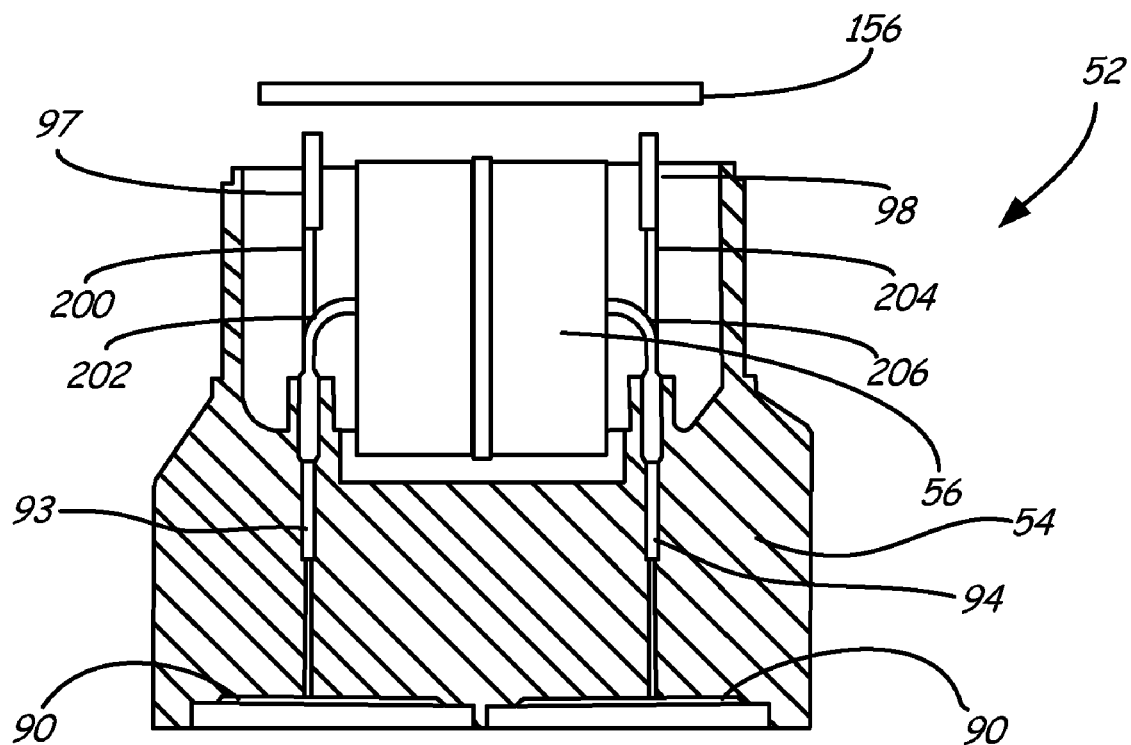
FIG. 4 is a cross sectional view of a sensor module of the transmitter of FIG. 3.

FIG. 4 is a cross sectional view of sensor module 52 shown in greater detail. As illustrated in FIG. 4, tube 93 includes a bent portion 202 which couples to the differential pressure sensor 56. Further, tube 93 includes an extension portion 200 which couples to line pressure sensor 97. In a similar manner, tube 94 includes a bent portion 206 which connects to differential pressure sensor 56 and an extension portion 204 which couples to line pressure sensor 98.

Figure 5:
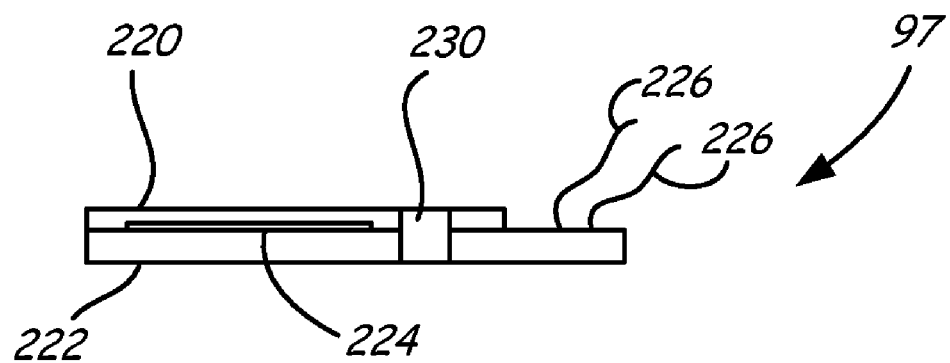
FIG. 5 is a cross sectional view of a line pressure sensor.

FIG. 5 is a side cross sectional view of one example of line pressure sensor 97. In the example of FIG. 5, line pressure sensor 97 is formed of two sapphire substrates 220 and 222 which are bonded together and form a vacuum cavity 224 there between. Vacuum cavity 224 includes two capacitor plates (not shown) which couple to electrical connection leads 226. Electrical connection leads 226 connect to circuitry in sensor board 156. A braze band 230 is provided and is used for coupling the sensor 97 to the tube 93.

Figure 6:
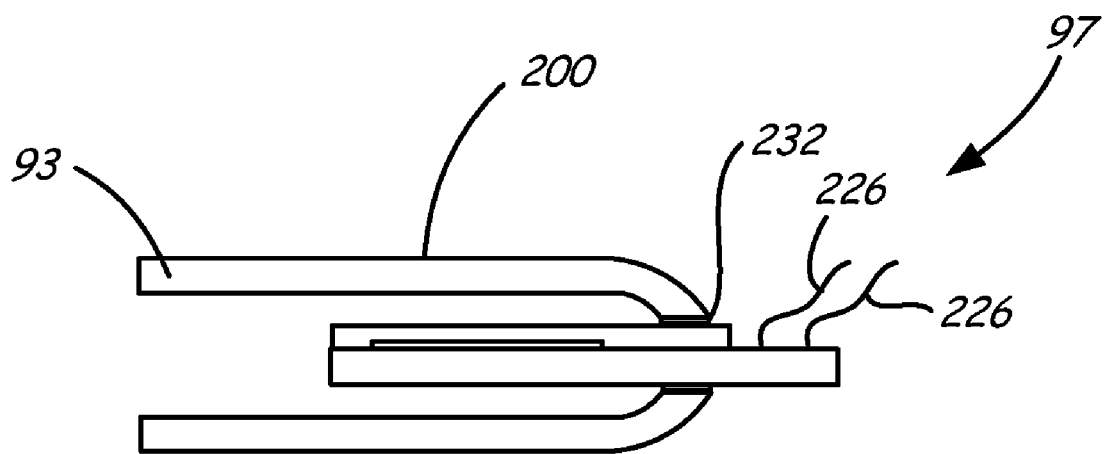
FIG. 6 is a cross sectional view of the line pressure sensor of FIG. 5 mounted in a tube.

FIG. 6 is a cross sectional view of line pressure sensor 97 mounted in the extension portion 200 of tube 93. The tube 93 can be formed of nickel and filled with a substantially incompressible fluid such as oil. The extension portion 200 of the tube 93 includes an opening formed therein which supports pressure sensor 97. Pressure 97 is sealed to the extension portion 200 using, for example, to a braze 232.

Referring back to FIG. 2, the sensor signals from pressure sensors 56, 97 and 98 are received by circuitry in transmitter 36. This circuitry includes, for example, circuitry in the sensor module 52 or on the electronics board 72. For example, microprocessor circuitry 74 can process the line pressure signals to provide enhanced functionality to the transmitter 36. Such enhanced functionality includes diagnostics, extended measurement range, redundant sensor measurements, calibration, calculation of additional process variables such as mass flow rate, etc.

The use of additional sensors can be used to extend the range over which the device is capable of sensing pressure. For example, the line pressure sensors 97 and 98 can be used to sense the differential pressure of the process fluid in instances when the pressure exceeds the upper range limit of pressure sensor 56. Although such a configuration may reduce the accuracy of the pressure measurements, in some instances this tradeoff may be acceptable in order to provide the increase measurement range. This can be useful both for measuring flow rates as well as differential pressure.

The additional sensors 97, 98 can be used to enable redundant differential pressure measurements for use in providing sensor diagnostics. For example, at pressures less than 250 inches $H_2O$, the sensors 97, 98 can be used to measure the differential pressure and provide a redundant differential pressure measurement. The differential pressure measured using line sensors 97 and 98 can be compared with differential pressure measured using differential pressure sensor 56. The microprocessor 74 can use any differences between these two measurements to identify a failing sensor.

In one configuration, the additional absolute pressure sensors 97 and 98 are used to provide differential pressure measurements if the differential pressure sensor 56 has failed or is providing an inaccurate measurement. This configuration allows the transmitter 36 to operate in a limited (or "limp") mode having a reduced accuracy until the failed equipment can be repair or replaced. If microprocessor system 74 detects that sensor 56 has failed, for example, by providing no signal output, the microprocessor 74 can calculate differential pressure based upon the outputs from sensors 97 and 98. This calculated differential pressure can be transmitted to a remote location. The transmission may optionally include diagnostic information such as information which indicates that the transmitted process variable has a reduced accuracy because the transmitter is operating in a "limp" mode. This configuration allows the industrial process to continue operation, perhaps at a reduced capacity, until repairs can be implemented.

In another configuration, diagnostics are performed by microprocessor system 74 on the absolute pressure sensors 97, 98 based upon the differential pressure measured by differential pressure sensor 56. During normal operation, the pressure measured by one of the line pressure sensors 97, 98 should be substantially equal to a difference between the pressure measured by the other line pressure sensor 97, 98 and the differential pressure measured by differential pressure sensor 56. Similarly, the additional line sensors 97, 98 can be used to identify a plugging of impulse piping or a failing primary element.

In the embodiments described, the use of two different types of sensors can be used to provide sensors having different frequency responses. For example, the metal diaphragm used in differential pressure sensor 56 described herein has an effective low pass filter that tends to filter out higher frequency process noise. On the other hand, the sapphire based line pressure sensors 97, 98 described herein have a higher frequency response and are capable of providing measurements with a faster response time. This high frequency response can be used to measure noise signals on either side of the differential pressure sensor 56. This can be used to provide enhanced process statistics or diagnostics, such as identifying a plugged line or other failing component in the process. The line pressure signals can also be used to calibrate the differential pressure sensor 56 as well as be used to compensate the differential pressure measurement for any changes due to high line pressure. For example, the configuration of pressure sensors 97 and 98 described above offers relatively stable measurements over an extended time period. As the sensors 97 and 98 are relatively stable, their measurements can be used to calibrate drift in the measurements provided by pressure sensor 56. Thus, calibration can be performed by microprocessor 74. In another example, the additional pressure measurements provided by line pressure sensors 97 and 98 can be used to provide accurate span line pressure compensation by microprocessor 74 to differential pressure sensor 56 pressure measurements. In one configuration, the use of two absolute pressure sensor measurements can be used to more accurately compensate for variations of the differential pressure measurements. Compensation algorithms can be implemented in microprocessor 74.

In one configuration, the line pressure sensors 97 and 98 have an upper range limit of about 5,000 psi. The sensors 97, 98 can be placed anywhere in the device, however the location described above in association with the fill tubes 93, 94 offer a convenient position. As the line pressure sensors 97, 98 described herein operate based upon capacitance variation, various operations and components of the measurement system may be shared with the differential pressure sensor 56, such as temperature sensor 63 shown in FIG. 2, which also operates based upon capacitance variations. In one embodiment, a temperature sensor is provided within sensors 97 and/or 98. This can be used to compensate for temperature variations in their measurements. Further, a reference capacitor (not shown) can be implemented in sensor 97 and/or 98 to further enhance accuracy of absolute pressure measurements. The dual absolute line pressure sensors 96, 98 may also be used in other process variable measurement configurations such as an inline unit in which the sensors can be positioned in parallel with a strain gauge.

Although the present invention has been described with reference to preferred embodiments, workers skilled in the art will recognize that changes may be made in form and detail without departing from the spirit and scope of the invention. The line pressures sensors 97 and 98 can be coupled to $P_1$ and $P_2$ in any appropriate manner and are not limited to the tube configuration shown herein. The various functions described above can be implemented using any appropriate circuitry and the implementation of such functionality can be shared between components and implemented using the same or separate circuitry. As used herein "transmitter circuitry" refers to any circuitry within transmitter 36. As used herein, "enhance functionality" includes system diagnostics, component, diagnostics, process diagnostics, extended operation range, calibration of components, statistical process measurements and limited device operation in the event of a component failure.

What is claimed is:

1. A process variable transmitter for measuring a pressure of a process fluid, comprising:
   a process coupling having a first port configured to couple to a first process pressure and a second port configured to couple to a second process pressure;

a differential pressure sensor coupled to the first and second ports having an output related to a differential pressure between the first pressure and the second pressure;

first and second pressure sensors coupled to respective first and second ports having outputs related to the first and second pressures; and transmitter circuitry configured to provide a transmitter output based upon the output from the differential pressure sensor and further provide enhanced functionality based upon the first and second pressures;

wherein the first and second pressure sensors comprise a brittle material having a cavity formed therein and wherein the outputs from the first and second pressure sensors are related to deformation of the cavity.

2. The process variable transmitter of claim 1 wherein the transmitter is configured to calculate differential pressure based upon the outputs from the first and second pressure sensors.

3. The process variable transmitter of claim 1 including a tube which couples the first port to the first pressure sensor and to the differential pressure sensor.

4. The process variable transmitter of claim 3 wherein the tube includes an extension portion and the first pressure sensor is mounted at a distal end of the extension portion.

5. The process variable transmitter of claim 1 wherein the first and second pressure sensors have a frequency response which is greater than a frequency response of the differential pressure sensor.

6. The process variable transmitter of claim 1 wherein the first and second pressure sensors are configured to operate at pressures which are greater than a maximum operating pressure of the differential pressure sensor and the transmitter circuitry is configured to provide a transmitter output based upon the first and second pressure sensors to thereby provide extended range to the process variable transmitter.

7. The process variable transmitter of claim 1 wherein the transmitter circuitry is configured to provide a differential pressure output based upon a difference between the output from the first pressure sensor and the output from the second pressure sensor when the differential pressure sensor is degraded.

8. The process variable transmitter of claim 3 wherein the first pressure sensor extends into the tube and is sealed to the first pressure sensor by a braze.

9. The process variable transmitter of claim 1 wherein the enhanced functionality include detecting a plugged line.

10. The process variable transmitter of claim 1 wherein the enhanced functionality are based upon a frequency of a signal sensed by the first and second pressure sensors.

11. The process variable transmitter of claim 1 wherein the enhanced functionality include calibrating the differential pressure sensor based upon outputs from the first and second pressure sensors.

12. A method of measuring a pressure of a process fluid in a process variable transmitter, comprising:

coupling a first tube to a first process pressure;

coupling a second tube to a second process pressure;

sensing a differential pressure between the first process pressure and the second process pressure using a differential pressure sensor coupled between the first and second tubes;

sensing the first process pressure with a first pressure sensor coupled to the first process pressure through the first tube;

sensing a second process pressure with a second pressure sensor coupled to the second process pressure through the second tube;

providing a transmitter output related to the differential pressure sensed by the differential pressure sensor;

performing enhanced functionality to the process variable transmitter based upon outputs from the first and second pressure sensors; and wherein the first pressure sensor comprises a brittle material having a cavity formed therein and wherein the output from the first pressure sensor is related to deformation of the cavity.

13. The method of claim 12 including calculating a differential pressure based upon the outputs from the first and second pressure sensors.

14. The method of claim 12 wherein the first tube includes an extension portion and the first pressure sensor is mounted at a distal end of the extension portion.

15. The method of claim 12 wherein the first and second pressure sensors have a frequency response which is greater than a frequency response of the differential pressure sensor and the diagnostics are based upon a sensed frequency.

16. The method of claim 12 including detecting line plugging based upon the sensed first and second pressures.

17. The method of claim 12 including diagnosing operation of the differential pressure sensor based upon the sensed first and second pressures.

18. The method of claim 12 including sensing differential pressure based upon the sensed first and second pressures when the differential pressure sensor is degraded.

19. The method of claim 12 including calibrating the differential pressure sensor based upon the sensed first and second pressures.

* * * * *